Dec. 4, 1951 T. E. CURTIS 2,577,003
DERIVATIVE-COMPUTING SERVO MECHANISM CONTROL
FOR PRIME MOVER DYNAMO PLANTS
Filed Aug. 19, 1947 5 Sheets-Sheet 1

INVENTOR.
THOMAS E. CURTIS
BY Arlington C. White
ATTORNEY

Dec. 4, 1951 T. E. CURTIS 2,577,003
DERIVATIVE-COMPUTING SERVO MECHANISM CONTROL
FOR PRIME MOVER DYNAMO PLANTS
Filed Aug. 19, 1947 5 Sheets-Sheet 2
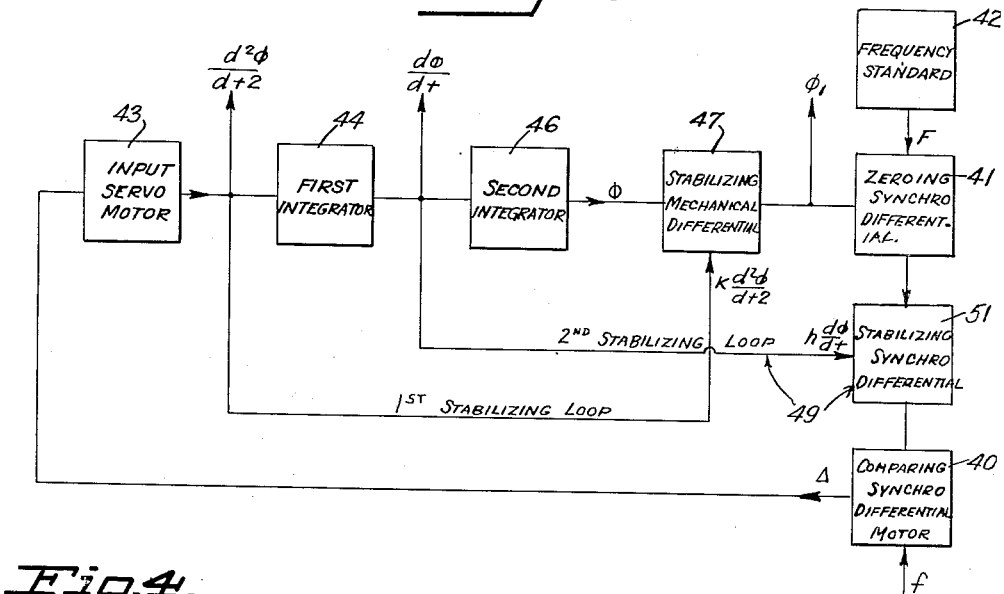
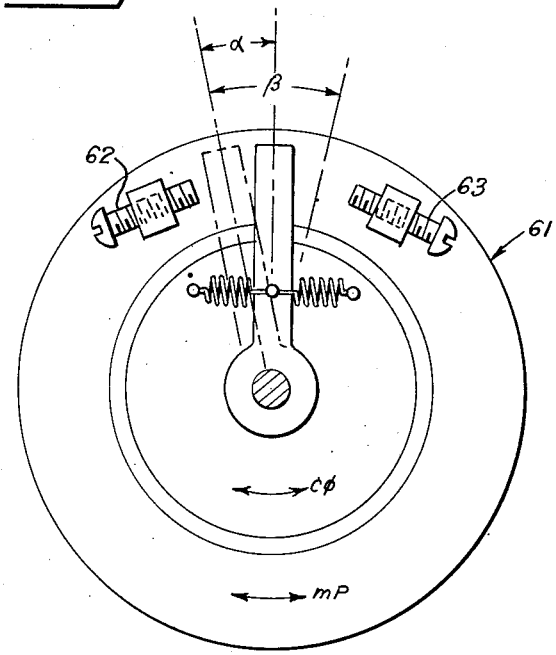
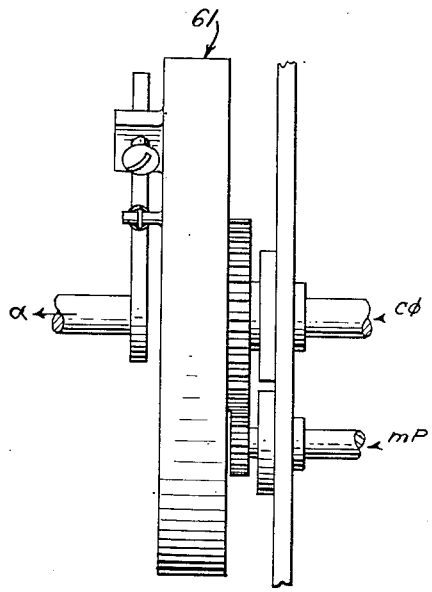
INVENTOR.
THOMAS E. CURTIS
BY
*Arlington White*
ATTORNEY

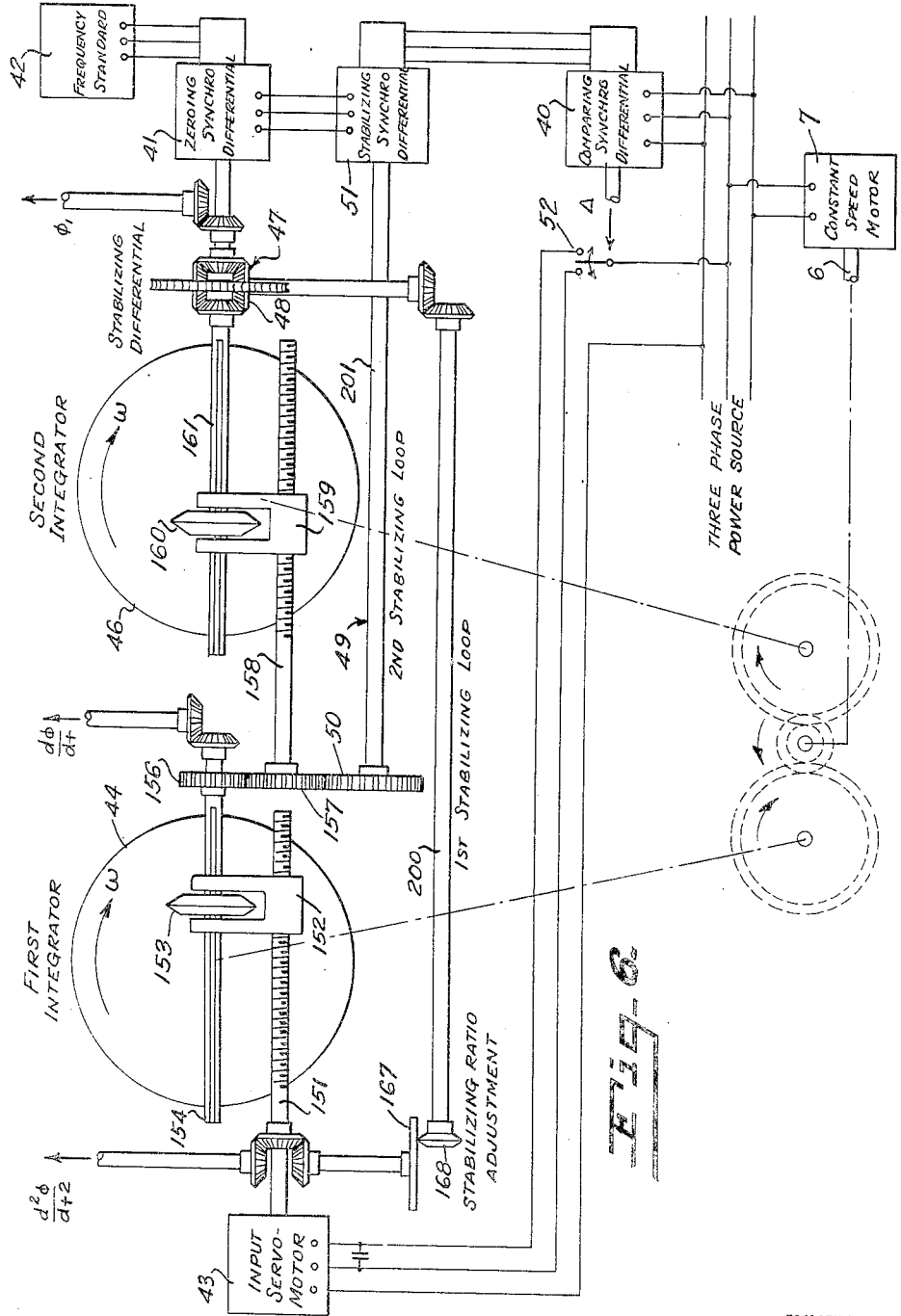

INVENTOR.
THOMAS E. CURTIS
BY
Arlington C. White
ATTORNEY

Dec. 4, 1951                T. E. CURTIS            2,577,003
DERIVATIVE-COMPUTING SERVO MECHANISM CONTROL
FOR PRIME MOVER DYNAMO PLANTS
Filed Aug. 19, 1947                             5 Sheets-Sheet 5

INVENTOR.
THOMAS E. CURTIS
BY
ATTORNEY

Patented Dec. 4, 1951

2,577,003

UNITED STATES PATENT OFFICE 2,577,003

DERIVATIVE-COMPUTING SERVO MECHANISM CONTROL FOR PRIME MOVER DYNAMO PLANTS

Thomas E. Curtis, Berkeley, Calif.

Application August 19, 1947, Serial No. 769,387

1 Claim. (Cl. 290—4)

The invention, in general, relates to power system governors and more particularly relates to an improved system affording automatic, continuous computation of the mathematical relationship between the various factors of a power system and a frequency standard, with automatic compensation during operation of the power system.

Heretofore, there has been appreciable attention devoted by those skilled in the art to the provision of apparatus and systems for regulating or governing electric generating systems. Some of the prior work in this field has been directed to the development of systems for regulating power generating plants having a steam plant as the prime mover, some of such systems being responsive to the generator output or variations in the magnitude of the output to regulate the supply of fuel and air to the prime mover, and others being responsive solely to variations in speed of the prime mover. Other improvements heretofore developed in the governor art, with respect to power systems, have been directed to the utilization of electronic devices for measuring the rate of change of frequency with respect to time, thus approximating primary sensitivity to load. In general, most of these prior governor systems, being either sensitive only to speed, or to load variations, require auxiliary devices to furnish response to other variables of the electric generating system being governed. It seems clear that optimum results can be accomplished only where governors have coordinated response to power system variables pertaining to load, frequency, time, and proximity to load. The present invention is directed to the provision of a single, integrated apparatus and system affording primary sensitivity to the three operating conditions of an electric generating system; namely, to load, frequency, time and proximity to load. The problems of power system control, in accordance with my invention, are resolved from primary theoretical concepts as will hereinafter appear.

A primary object of the invention is to provide a derivative-computing servomechanism which continuously computes the electrical phase angle, as well as the first and second derivatives with respect to time of the electrical phase angle, between a given power system and a frequency standard.

Another important object of my invention is to provide a single, integrated instrument which has the capacity to furnish a conventional hydraulic governor in a power system with primary sensitivity to load, frequency, time, and proximity to load.

A still further object of the present invention is to provide an apparatus and system of the indicated basic nature which is further characterized by its adaptability to application to either single or interconnected power systems.

Another object of the invention is to provide a derivative-computing servomechanism which, when applied to an interconnected power system, affords automatic division of the load between the several generating stations of the interconnected system, and enables the restoration of equilibrium between the units as well as automatic replacement of the units in synchronism with each other.

A still further object of my invention is to provide a system and apparatus of the aforementioned character which resolves at high speeds the amount of power change required to restore equilibrium in any given power system.

Another object of the invention is to provide a derivative-computing servomechanism which includes stabilization circuits affording optimum compensation for the inertia of the system and for other factors related to overall stability of the system.

Other objects of the invention, together with some of the advantageous features thereof, will appear from the following description of a preferred embodiment and certain modified embodiments of the invention which are illustrated in the accompanying drawings. It is to be understood that I am not to be limited to the precise embodiments illustrated, nor to the precise type or arrangement of the various parts thereof, as my invention, as defined in the appended claim, can be embodied in a plurality and variety of forms, and is flexible for adaptation to a variety of different applications.

Referring to the drawings:

Figure 3 is a block diagram of the preferred embodiment of the invention in a derivative-computing servomechanism.

Figure 4 is a front elevational view of a power angle element of a preferred embodiment of the invention, the element being illustrated in block in Figure 8 of the drawings.

Figure 5 is a side elevational view of the element illustrated in Figure 4.

Figure 6 is a diagrammatic view of the preferred embodiment of the invention, as applied to a three-phase power system, with details of the construction of the derivative-computing servomechanism and the stabilizing loops of the system.

Figure 1:
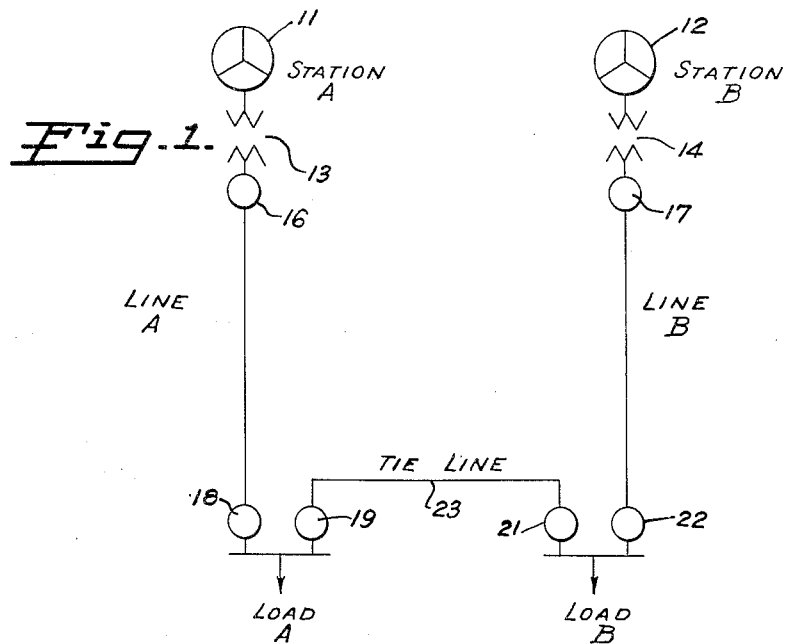
Figure 1 is a diagrammatic view of a typical power system to which the preferred embodiment of my invention is applicable.

In its preferred form, as applied to an electrical generating system, the derivative-computing servomechanism of my invention preferably comprises, in combination with an electrical generating system and a conventional hydraulic governor therefor, means responsive to system frequency deviation with respect to a frequency standard for generating a mechanical quantity representing the electrical phase angle between the two frequencies, which may be defined as the absolute power angle of the system at a given point, together with means operable simultaneously with said first named means for automatically and continuously computing the first and second derivatives of said absolute power angle with respect to time whereby the power system is controlled as a combined function of the absolute power angle as well as the first and second derivatives thereof.

While I have indicated hereinabove that my derivative-computing servomechanism has especial application to governing electrical generating systems, it is to be understood that the servomechanism may also be applied and utilized effectively in various other environments, such as to compute the rates of change of temperatures, pressures, electric current or other indicated quantities, whether mechanical or electrical. For ease and simplicity of illustration and description only, however, I have principally described and illustrated the invention as applied to the control of power systems, or electrical generating systems.

Inasmuch as the fundamental concept of the present invention is embodied largely in a servomechanism and embraces its behavior, in the selected environment for description thereof herein, with relation to any given electrical generating system containing a conventional hydraulic governor, it is desirable at the outset to state that by servomechanism is meant an association of coacting elements including a controller element that is actuated by a function of the difference between a response desired and the actual response of the system. That is to say, any given power system is error-sensitive and the control element of the particular servomechanism employed is to be responsive to some function of the error in the behavior of the system. In other words, it is usual that a continuous change in the actuating quantity or the input signal of the input servomotor of the servomechanism, which is responsive to such deviation of errors, is to be followed by a continuous action of the controller. Systems of this kind, obviously, are closed-cycle, continuous-controlled and it is this property, i. e., this closed-cycle property that identifies them as servomechanisms. The present invention, as applied to a power system, is directed to the utilization of a servomechanism in an electrical generating system, governed by a conventional hydraulic governor, which affords the coordinated response of the governor to system conditions of load, frequency, time, and proximity to load.

The invention herein described and illustrated, therefore, is devised to afford optimum governing of any given power system wherein the control is a combined function of $d^2\phi/dt^2$, $d\phi/dt$, and $\phi$. As indicated above, $\phi$ is a generated mechanical quantity which represents the electrical phase angle between the frequency of the system and a frequency standard; $d\phi/dt$ represents the deviation of the system frequency from a frequency standard with respect to time $t$, or the first derivative of the absolute power angle $\phi$ with respect to time; and $d^2\phi/dt^2$ is the second derivative of the absolute power angle with respect to time, or represents the rate of deviation of the system frequency from a frequency standard.

As illustrated in the annexed drawings, the derivative-computing servomechanism which I preferably employ in the preferred embodiment of my invention comprises six principal elements or members. These six main elements comprise a snychro system, such as the system commercially available and marketed under the trade-mark "Selsyn," for comparing continuously the power system against a frequency standard and for tending to keep the deviation to zero; an error-input servomotor which provides $d^2\phi/dt^2$ input to a first integrator; first and second integrators whose discs are driven at an approximately constant speed, the $d\phi/dt$ output of the first integrator providing the input to the second integrator; two stabilizing loops in roduced either in the output of the first integrator or in the synchro system; and a synthesizing computer.

With particular reference to Figures 1 and 3 of the drawings, I have shown in Figure 1 a typical power system to which the present embodiment of my invention is applicable, the power system including two stations, designated station A and station B at which current is generated by the alternators 11 and 12 and transmitted over line A and line B which may contain transformers 13 and 14 as well as conventional translating devices 16, 17, 18, 19, 21 and 22. The two circuits of this typical power system may be connected for synchronous operation through a tie line 23.

In the power system depicted in Figure 1, the absolute power angle $\phi$ will vary at different points in accordance with power distribution. As is perhaps well known, the power transmitted between any two points is expressible approximately by the following equation:

$$p = \frac{E_r \cdot E_s}{X} \cdot \sin \delta$$

where $E_r$ is the voltage at the receiving terminal, $E_s$ is the voltage at the sending terminal, $X$ is the reactance in ohms between the two terminals, and $\delta$ is the electrical phase angle between $E_r$ and $E_s$. Therefore, under equilibrant conditions, differences between the absolute power angle $\phi$ at different points represent the power flow between the points. When the system is not in equilibrium, the power differential results in a departure of the second derivative of the power angle ($d^2\phi/dt^2$), with respect to time, from zero and can be expressed approximately by the equation:

$$\frac{d^2\phi}{dt^2} = K \cdot \Delta p \cdot I$$

where $\Delta p$ is the differential between the generated power and the load, $I$ is the effective moment of inertia, and $K$ is a constant determined by the units of $p$ and $I$. Obviously $d\phi/dt$ represents deviation of the system frequency from standard frequency.

Figure 2:
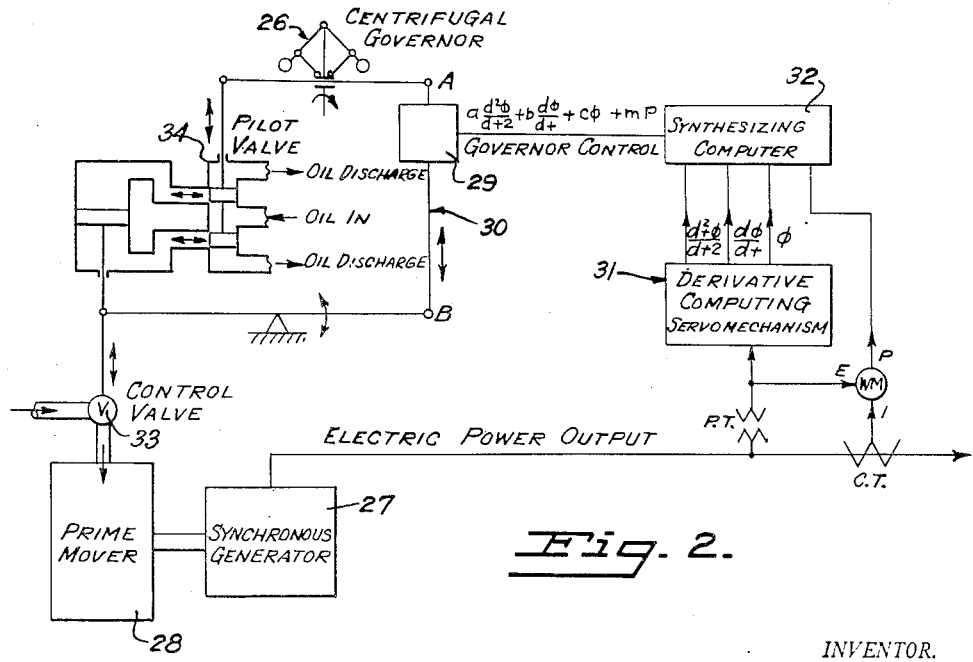
Figure 2 is a schematic view of the preferred embodiment of the invention in a power governing system, with appropriate notations indicating functions of units.

I have illustrated in Fig. 2 of the annexed drawings my governor or control apparatus for such a power system and my proposed control preferably employs a conventional hydraulic governor, designated generally by the reference numeral 26, having drooping speed characteristics. My control, inclusive of the derivative-computing servomechanism, contemplates varying the length of the link A—B, designated by the reference numeral 30, as a function of the following quantity:

$$a \cdot \frac{d^2\phi}{dt^2} + b \cdot \frac{d\phi}{dt} + c\phi + mP$$

where $P$ is the power output of the generator, and $a$, $b$, $c$ and $m$ are factors adjustable for optimum governing of any given power system. Control component $mP$ permits principal control operating about or near their zero points by the three primary control components $$a \cdot \frac{d^2\phi}{dt^2}, \quad b \cdot \frac{d\phi}{dt}, \quad \text{and } c\phi$$

The complete governing apparatus for the power system comprises, in addition to the governor 26 for the synchronous generator 27, a governor control 29 which varies the length of link 30 in accordance with the output of the derivative-computing servomechanism 31 and the synthesizing computer 32; the system also including a conventional control valve 33 and pilot valve 34 in association with the prime mover 28 that drives the generator 27 and the centrifugal governor 26.

In Figs. 3 and 6 of the drawings, I have illustrated, in block diagram as well as in some detail, the derivative-computing servomechanism of my invention, as it is applied to a typical power system. With this apparatus, the power system frequency is compared against a frequency standard continuously through a synchro system including self-synchronous repeaters comprising a plurality of wound rotor induction motors, known as synchros, arranged in series in the power system which, in the illustration of the present embodiment of Fig. 6 is a three-phase system but which can be single phase, as indicated in Fig. 3. It may be stated, parenthetically, that the use of a primary frequency standard is justified for the power system control, since it is desirable that frequency standards at different controlling stations should have sufficient precision to remain in synchronism with each other. As an alternative, it seems clear that the output of one frequency standard can be transmitted over communication channels to all controlling stations. But application of a primary standard frequency in either manner would provide, it is believed, unprecedented precision of power system time.

The servomechanism illustrated operates so that a zeroing synchro 41 is rotated continuously to "zero" any difference between power system frequency $f$ and the frequency standard F, as designated by the block 42. Rotation of the zeroing synchro 41 is in accordance with double integration of the quantity $d^2\phi/dt^2$. As shown in Figs. 3 and 6, an input servomotor 43 constitutes a component part of the servomechanism of the present invention. In the preferred embodiment, the servomotor comprises a capacitor-type reversible motor, and it is sensitive and responsive to an error signal $\Delta$ set up through a comparing synchro 40 when "zeroing" is not complete. The operation of the servomotor 43 automatically changes the setting of the quantity $d^2\phi/dt^2$ in accordance with the error signal $\Delta$. The servomechanism also includes a first integrator 44, a second integrator 46, and stabilizing differential members 47 and 49, as indicated in Fig. 6, in addition to the comparing, zeroing and stabilizing synchros 40, 41 and 51, respectively. The first integrator yields the quantity $d\phi/dt$ which, in turn, is passed through the second integrator to yield $\phi$. Since the servomotor 43 cannot respond at infinite speed, and due to the existence of inertia in the system, the stabilization member 47 is required. Stabilizing member 49 establishes, in effect, a "drooping" characteristic of $\phi$ with respect to $d^2\Phi/dt^2$. I have found, by actual test, that such stabilization was necessary to afford the most efficacious results. In my present system, the stabilizing member 47 functions to take a fraction of the quantity $d^2\phi/dt^2$ from the input servomotor 43 and to introduce the fraction, in differential form, either into the output of the second integrator or in the synchro system. In Fig. 6, I have shown the stabilization member 47 as introducing the above mentioned fraction into the output of the second integrator through a gear differential 48 while in Fig. 3 I have shown the fraction introduced, as an alternative, into the synchro system between the comparing and zeroing synchros, as indicated by the dotted block 49.

Fig. 6 indicates schematically the construction of the derivative-computing servomechanism, and it is to be noted that the two integrator discs 44 and 46 are driven at approximately constant rate by a constant speed motor, as at 7. As above mentioned, the stabilizing member 47 introduces the fraction of the quantity $d^2\phi/dt^2$ into the output of integrator 46 through gear differential 48.

With this arrangement, the servomotor is enabled to anticipate the reaching of a new solution which will restore the zeroing action of the servomechanism. For example, when the input servomotor 43 is running, its motion adds a leading component in the rotation of the zeroing synchro 41, so that input to the servomotor will stop just before the new solution is reached. Adjustment of the stabilizing ratio permits setting of this leading characteristic to provide optimum compensation for the inertia of the system. By actual test, as stated hereinabove, I have found that the second stabilizing loop is requisite to stabilize the operation of the second integrator and this is accomplished by means of introducing a proportion of $d\phi/dt$ through a proportioning gear 50 into the synchro system, thus stabilizing synchro differential 51. It should be noted that the introduction of the stabilizing loops causes a slight modification of the absolute power angle $\phi$. For this reason, the views of Figs. 3 and 6 indicate the output as $\phi_1$. However, it may be pointed out that this slight modification only takes place when $d^2\phi/dt^2$ or $d\phi/dt$ deviates from zero and that is substantially compensable by settings of the synthesizing computer, not shown in Figs. 3 and 6 but illustrated in block diagram in Fig. 2 between the servomechanism and the governor. Therefore, the difference between $\phi$ and $\phi_1$ can be regarded as negligible. It also may be noted that effective braking of the input servomotor 43 may be accomplished by momentary closing of the reversing contacts 52 of the comparing synchro 40. Hunting is inherently opposed, because the $\Delta$ contacts in braking action will re-open as the speed of the servomotor drops. As indicated, the input servomotor is a capacitor-type reversible motor, and its rotation is reversed by reversing the phase rotation through the $\Delta$ contacts. Of course, the servomotor 43 can take many other forms.

Figure 7:
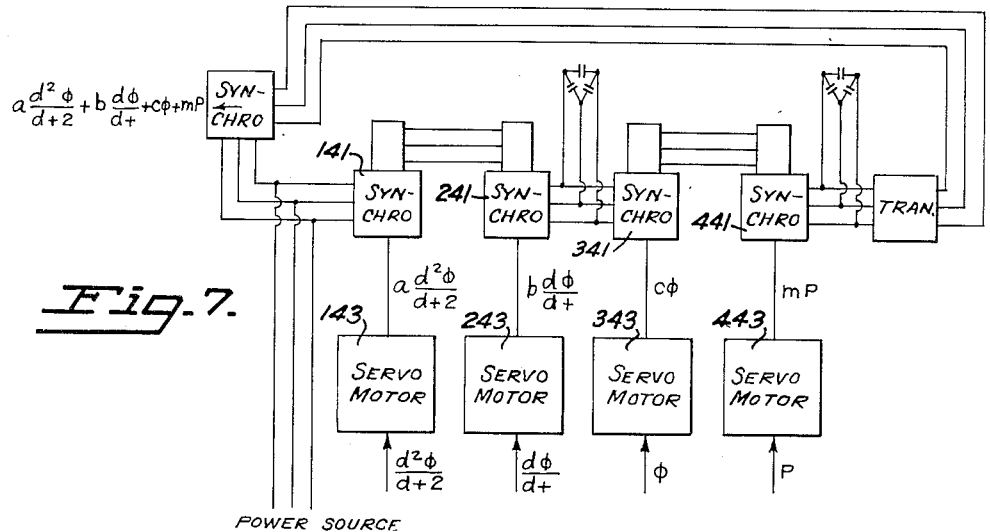
Figure 7 is a block diagram or schematic view of one arrangement of the preferred embodiment of the invention, this view also containing a diagrammatic showing of electrical connections.

In Fig. 7 of the annexed drawings, I have illustrated one arrangement of the synthesizing computer employed, wherein a series of servomotors 143, 243, 343 and 443 are provided for driving the synchros 141, 241, 341, and 441 and wherein the output gearing, not shown, of the several servomotors determine the values of the factors $a$, $b$, $c$ and $m$. Servomotors 143, 243 and 343 may be omitted when outputs of the servomechanism do not require power amplification. With the synthesizing computer in the governing system for the power system, and with the arrangement of the synthesizing computer units as indicated in Fig. 7, the adjustment or setting of the factor $a$ will determine the power change in response to $d^2\phi/dt^2$, and this factor should be set in accordance with the effective inertia in the system. Where the sensitivity of an existing centrifugal governor in a given power system is adequate, the factor $b$ may be set equal to zero. It should be noted that overall sensitivity to $d\phi/dt$ may be reduced by changing the algebraic sign of $b$. The adjustment or setting of the factor $c$ determines the "stiffness" of the power system time stability. A high numerical value of the factor $c$ is requisite in order to achieve automatic load division between controlled generators. And the $mP$ component permits the other three control components to operate about or near their zero points throughout the power range of the generator.

Figure 8:
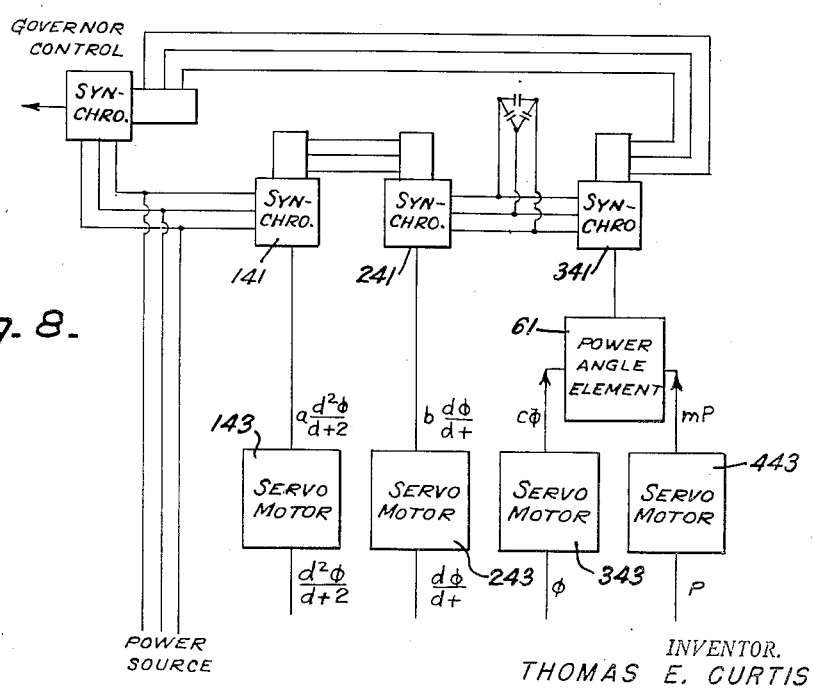
Figure 8 is a block diagram of a modified embodiment of the invention containing a power angle element and with a diagrammatic view of electrical connections.

In Fig. 8 of the drawings, I have illustrated a modification of the synthesizing computer wherein a power angle element 61 is interposed between the two servomotors 343 and 443 serving the control components $c\phi$ and $mP$ and the combined synchro 341 in lieu of the former two synchros 341 and 441, as indicated in Fig. 7. Details of the power angle element 61 are shown in Figs. 4 and 5, in front and side elevation, respectively, wherein set screws 62 and 63 are provided for varying a limiting angle. The arrangement of synthesizing computer depicted in Fig. 8, which includes the power angle element 61, will permit high settings of the factor $c$ in order to accomplish load division between generating stations as a function of proximity to load center. It should be recognized that precautions must be taken to avoid over-controlling by the $c\phi$ component on large load changes where the response of the generator prime movers may lag due to such effects as inertia of water in penstocks. Accordingly, it is well to establish boundaries for response to control component $c\phi$, and that is accomplished by the mechanism illustrated in Fig. 8 which permits direct response of the governor to component $c\phi$ so long as $mP$ follows $c\phi$ within a limiting angle $\beta$. If the power response lags $c\phi$ beyond this limit, over-controlling is prevented by stops, such as set-screws 62 and 63, which change the mechanism output from $c\phi$ to $mP \pm \beta/2$. This action, in effect, biases the governor in the proper corrective direction, and component $c\phi$ will take over again when the load swing is checked.

In Figs. 1 to 8 of the drawings, I have illustrated in detail as well as in block schematic diagram the various elements of my derivative-computing servomechanism and its association with conventional elements of a typical governor-controlled electrical generating system, together with some of the principal driving connections between certain elements in order to show the coactions and relationships between the principal units. With particular reference to Fig. 6, it is to be observed that motor shaft 6, of a constant speed motor, as at 7, drives the discs 44 and 46 through suitable gearing at rate $\omega$. The error input servomotor 43 which rotates lead screw 151, positions wheel guide 152 as well as splined wheel 153 carried thereby. The disc 44 drives splined wheel 153 by friction which effects rotation of splined shaft 154, which is journaled in suitable bearings. The rotation of splined shaft 154 represents substantially the time integral of displacement of splined wheel 153 from the center of the face of disc 44 of the first integrator. The rotation of the splined shaft 154 is transferred through gears 156 and 157 to the lead screw 158 of the second integrator whereby wheel guide 159 and splined wheel 160 on the guide are positioned substantially in proportion to the time integral of the displacement of the splined wheel 153 from the center of the face of the disc 44. Disc 46 of the second integrator drives, by friction, the splined wheel 160 which effects rotation of splined shaft 161; this rotation representing substantially the time integral of the displacement of splined wheel 160 from the center of the face of disc 46. The zeroing differential 41 is driven through stabilizing differential 48 by the rotation of splined shaft 161. A stabilizing or loop differential 200 is driven by a disc 167 and friction-drive wheel 168. The position of wheel 168 is adjustable so that the stabilizing loop can be adjusted for optimum performance of the servomechanism. It is to be understood that the wheel-and-disc friction drive depicted may be replaced by equivalent gearing when the optimum stabilizing loop proportion has been resolved by test. The second stabilizing loop 201 is driven from the input to the second integrator through gears 157 and 50, the relative sizes of which determine the proportion of the stabilization. Stabilization, with loop 201, is introduced into the synchro system by stabilizing differential 51.

It should be understood that rotation of splined shaft 161 by the second integrator represents the differential between integrated frequency and integrated standard frequency, and which has herein been designated or denoted $\phi$. This quantity is altered slightly, as above mentioned, by stabilizing differential 48 yielding the output quantity designated by $\phi_1$, which is supplied to the synthesizing computer, see Figs. 7 and 8. Rotation of the splined shaft 154 of the first integrator represents frequency (speed) of the power system and is supplied to the synthesizing computer as depicted in Figs. 7 and 8. The rotation of lead screw 151 represents the rate of change of frequency with respect to time, and is designated by the mathematical notation $d^2\phi/dt^2$. This quantity also is supplied to the synthesizing computer, see Figs. 7 and 8. It also is to be understood that the constants $a$, $b$ and $c$ are selected, by means of the output gearing of the synthesizing computer servomotors, to afford the optimum governing of any given power system, and these control quantities may be modified, as required, to provide desired operating characteristics and stability. Considerable importance is attached to the stabilizing loops of the system, and tests have proven that, in the present embodiment of the invention, both stabilizing loops are essential to the stable operation of the servo-mechanism. It is to be further understood that synchro differentials in such stabilizing loops are functionally equivalent to mechanical differentials, so that either type of differential may be applied.

Figure 9:
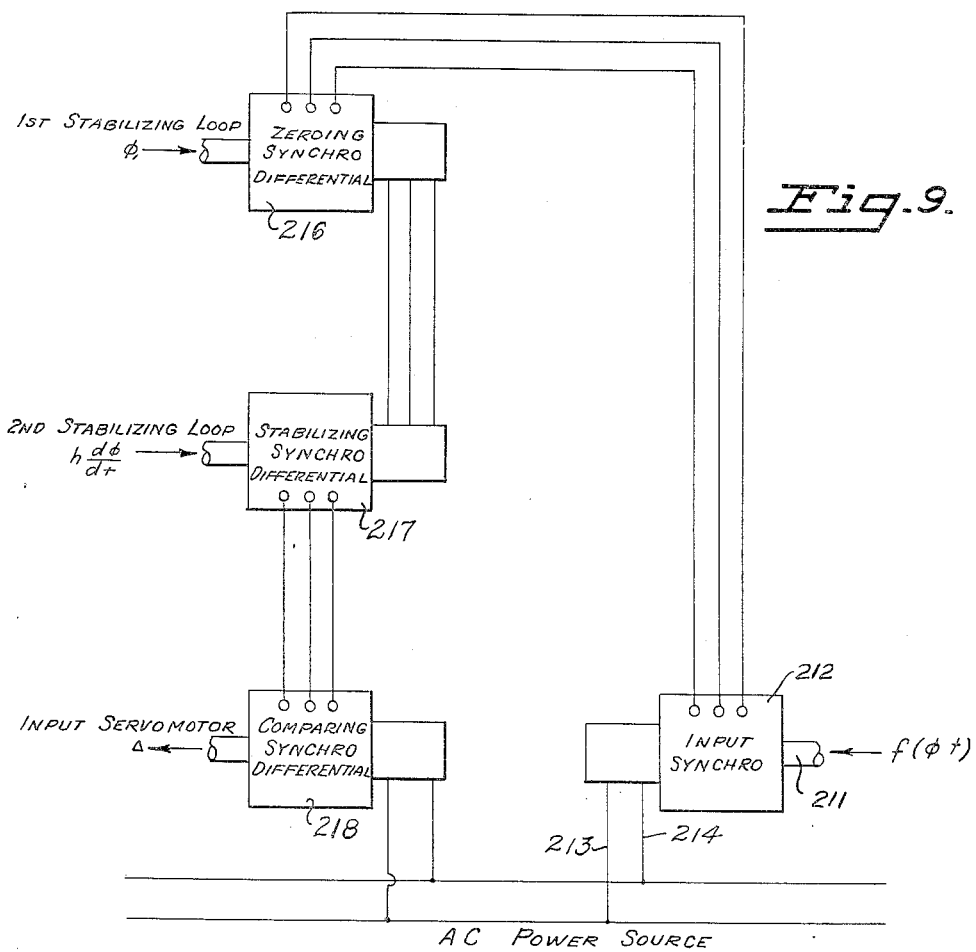
Figure 9 is a diagrammatic view of a typical stabilizing loop using synchro differentials, the loop being adapted to be employed in the servomechanism control system of the invention for mechanically rotated elements operating at indeterminate speeds.

In Fig. 9 of the annexed drawings, I have depicted a derivative-computing servomechanism arrangement which, with certain elements of Fig. 6, affords means for indicating and controlling the displacement and rate of change of displacement of any given mechanical input provided, of course, that the variations of such mechanical input are within the limits or ranges of the first and second integrators. Hence, this system affords, as will appear, automatic and continuous control and indication of variables of a multiplicity of different systems other than power or current generating systems, such as systems involving variations in pressures, temperatures that can be converted into mechanical motion, or electrical quantities or a variety of mechanical motions per se where continuous indication or control of the first and/or second derivatives of the quantities with respect to time are desired, or with respect to variables other than time. As illustrated, the mechanical input, designated by the reference character $f(\phi, t)$, which may rotate in some random, uncontrolled manner, is caused to drive the shaft 211 of an input synchro 212 which is electrically connected into an alternating current system by means of conductors 213 and 214. The alternating current circuit includes a zeroing synchro differential 216, a stabilizing synchro differential 217, and a comparing synchro differential 218. The arrangement of units of Fig. 9, as stated above, is to be taken in connection with Fig. 6 and when thus viewed it will be appreciated that when "zeroing" is incomplete the error signal $\Delta$ set up by the comparing synchro differential 218 is transmitted to the input servomotor 43, see Fig. 6. The servomotor introduces the quantity $$\frac{d^2\phi}{dt^2}$$

into the first integrator which yields $d\phi/dt$ at its output, while the second integrator receives $d\phi/dt$ at its input and yields $\phi$ at its output.

For purposes of stabilization, the quantity $\phi$ is modified by the first stabilizing loop to yield $\phi_1$ which is supplied to the zeroing synchro differential 216, see Fig. 9. Similarly, for further stabilization, the quantity $h.d\phi/dt$ is introduced into the stabilizing synchro differential 217.

Figure 10:
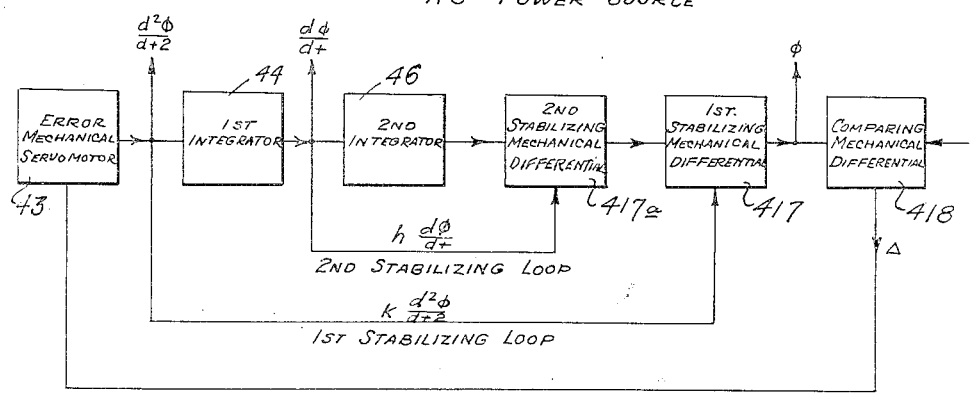
Figure 10 is a diagrammatic view of another typical stabilizing loop also utilizable in my servomechanism control system but employing mechanical differentials instead of synchro differentials.

The arrangement in Fig. 10 of the annexed drawings is similar to that of Fig. 9 except that the entire arrangement is mechanical rather than partially mechanical and partially electrical as in Figs. 6 and 9. Further, the function of the zeroing synchro differential 216 and of the comparing synchro differential 218 of the system of Fig. 9 is combined in a single comparing mechanical differential 418 in the system of Fig. 10. Thus, the system includes error mechanical servomotor 43 which receives the error $\Delta$ from the comparing mechanical differential 418 and introduces the quantity $d^2\phi/dt^2$ into the first integrator 44 which yields $d\phi/dt$, while the second integrator 46 receives $d\phi/dt$ at its input and yields the quantity $\phi$. However, for purposes of stabilization, two stabilizing mechanical differentials 417 and 417a are provided in the mechanical system of Fig. 10, the quantity $k.d^2\phi/dt^2$ being introduced to the first stabilizing mechanical differential, and the quantity $h.d\phi/dt$ being introduced into the second stabilizing mechanical differential 417a.

In addition to its application to environments other than power systems, as hereinabove just explained, the derivative-computing servomechanism of my present invention has especial application to a wide variety of types of power systems to afford optimum governing of the systems, and the amounts of power changes can be resolved at high speeds to restore equilibrium. Consequently, with my system, governors can be made sensitive not only to rates of change of frequency, changes in load and also to the absolute power angle so that current generating systems can be so controlled that individual generating stations in a power system containing a multiplicity of stations will be enabled to compensate for load changes as a function of their proximity or relative proximity to the point of load change. The dependence upon telemetering channels for load control will, therefore, be minimized, and unprecedented precision of power system time can be established with the derivative-computing servomechanism of my invention connected into the power system.

It is to be understood that the appended claims are to be accorded a range of equivalents commensurate in scope with the advance made over the prior art.

I claim:

A power system control comprising, in combination, an alternator, a prime mover, a governor therefor said governor being responsive to system conditions of load, frequency, time and proximity to load, and means for automatically and continuously changing the setting of said governor comprising a servomechanism driven by said alternator and responsive to variations in load, frequency and time of the power system; said servomechanism comprising a zeroing synchro, a comparing synchro, an input servomotor for driving said synchros; said servomotor being responsive to an error signal set up by said comparing synchro when zeroing by said zeroing synchro is not complete and yielding $d^2\phi/dt^2$, a first integrator responsive to the mechanical output of said servomotor and yielding $d\phi/t$, a second integrator responsive to the mechanical output of said first integrator and yielding $\phi$, means for driving said first and second integrators at a constant speed, a first stabilizing member connected to said servomotor; said first stabilizing member serving to take a fraction of the mechanical output of said servomotor and to introduce said fraction in differential form into the output of said second integrator, and a second stabilizing member connected to said first integrator; said second stabilizing member serving to take a fraction of the mechanical output of said first integrator and to introduce the same between said zeroing and comparing synchros.

THOMAS E. CURTIS.

REFERENCES CITED

The following references are of record in the file of this patent:

UNITED STATES PATENTS

| Number | Name | Date |
| --- | --- | --- |
| 1,682,461 | Allen | Aug. 28, 1928 |
| 1,741,713 | Holmes | Dec. 31, 1929 |
| 1,836,559 | Smoot | Dec. 15, 1931 |
| 1,953,790 | Warren | Apr. 3, 1934 |
| 1,988,458 | Minorsky | Jan. 22, 1935 |
| 2,087,326 | Marrison | July 20, 1937 |
| 2,109,283 | Boykow | Feb. 22, 1938 |
| 2,421,628 | Lake et al. | June 3, 1947 |